(12) United States Patent
Ogura et al.

(10) Patent No.: US 12,199,559 B2
(45) Date of Patent: Jan. 14, 2025

(54) SOLAR POWER GENERATION SYSTEM

(71) Applicant: OMRON Corporation, Kyoto (JP)

(72) Inventors: Ryo Ogura, Kyoto (JP); Erica Martin, Hoffman Estates, IL (US); Tomoko Endo, Hoffman Estates, IL (US); Tsuyoshi Uchida, Hoffman Estates, IL (US); Eiji Muraoka, Kyoto (JP); Hideaki Kojima, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 0 days.

(21) Appl. No.: 17/628,888

(22) PCT Filed: Aug. 5, 2019

(86) PCT No.: PCT/JP2019/030661
§ 371 (c)(1),
(2) Date: Jan. 20, 2022

(87) PCT Pub. No.: WO2021/024339
PCT Pub. Date: Feb. 11, 2021

(65) Prior Publication Data
US 2022/0255500 A1 Aug. 11, 2022

(51) Int. Cl.
*H02S 40/32* (2014.01)
*H02S 40/36* (2014.01)

(52) U.S. Cl.
CPC .............. *H02S 40/32* (2014.12); *H02S 40/36* (2014.12)

(58) Field of Classification Search
CPC .......... H02S 40/32; H02S 40/36; H02S 50/00; H02H 7/20; H02H 1/00; H02J 3/381; H02J 2300/24; Y02E 10/56
See application file for complete search history.

(56) References Cited

U.S. PATENT DOCUMENTS

| | | |
|---|---|---|
| 2008/0224536 A1 | 9/2008 | Yamazaki |
| 2008/0303503 A1 | 12/2008 | Wolfs |
| 2016/0190798 A1* | 6/2016 | Narla .................... H02H 7/122 307/80 |
| 2016/0372929 A1 | 12/2016 | Ishikawa |

(Continued)

FOREIGN PATENT DOCUMENTS

| | | |
|---|---|---|
| JP | 2008-227885 A | 9/2008 |
| JP | 2012-511299 A | 5/2012 |

(Continued)

OTHER PUBLICATIONS

The International Search Report of International Application No. PCT/JP2019/030661 issued on Sep. 3, 2019.

(Continued)

*Primary Examiner* — Michael Y Sun
(74) *Attorney, Agent, or Firm* — Shinjyu Global IP (57) ABSTRACT

The solar power generation system includes a string, an inverter, and a shut-off device. The string includes a plurality of solar cell modules connected in series. The inverter is connected to the string and is configured to convert the DC power output from the solar cell modules to AC power. The shut-off device is disposed at a plurality of intermediate points of the string and is configured to shut off a voltage output from the solar cell modules in response to a control signal from the inverter.

7 Claims, 5 Drawing Sheets

(56) References Cited

U.S. PATENT DOCUMENTS

2017/0271875 A1* 9/2017 Narla ................ H02S 40/32
2019/0027617 A1* 1/2019 Varlan ............... H02S 50/10

FOREIGN PATENT DOCUMENTS

| | | |
|---|---|---|
| JP | 3189106 U | 2/2014 |
| JP | 2015-186286 A | 10/2015 |
| JP | 2016-135016 A | 7/2016 |
| JP | 2016-158400 A | 9/2016 |
| WO | WO-2010078303 A2 * 7/2010 ....... H01L 31/02021 |

OTHER PUBLICATIONS

The Written Opinion of the International Searching Authority of International Application No. PCT/JP2019/030661 issued on Sep. 3, 2019.

* cited by examiner

| OPERATION MODE | WEATHER/ SUNSHINE | POWER GENERATION | CONTROL SIGNAL | RELAY OPERATION MODE |
|---|---|---|---|---|
| START | ☀ | YES | ON | ON |
| ACTIVE | ☀ | YES | ON | ON |
| SAFETY / NORMAL SHUT-OFF | ☾ ☁ | NO | ON | OFF |
| | ⛅ | UNSTABLE | ON | ON/OFF |
| EMERGENCY SAFETY SHUT-OFF | ☀ | YES | OFF | OFF |

SOLAR POWER GENERATION SYSTEM

This application is the U.S. National Phase of International Application No. PCT/JP2019/030661, filed on Aug. 5, 2019.

FIELD

The present invention relates to a solar power generation system.

BACKGROUND

In the United States, for the purpose of protecting firefighters from electrical shock in an emergency such as a fire, the introduction of a so-called rapid shutdown function that immediately stops power generation by a solar power generation system during an emergency has been mandated by the National Electrical Code (NEC) for solar power generation systems. For example, Published Japanese Translation No. 2012-511299 discloses a solar power generation system that stops the output of electrical power from a solar cell module to an inverter according to the operating state of the inverter.

SUMMARY

In a solar power generation system, in order to further improve the safety of firefighters in the event of a fire or the like, it is preferable to for example install in each solar cell module a shut-off device provided with the rapid shutdown function. However, if a shut-off device is installed for each solar cell module, the installation cost of shut-off devices becomes high.

An object of the present invention is to provide a solar power generation system capable of achieving both a reduction in the installation cost of shut-off devices and an improvement in safety in a solar power generation system.

A solar power generation system according to one aspect of the present invention includes a string, an inverter, and shut-off device. The string includes a plurality of solar cell modules connected in series. The inverter is connected to the string and is configured to convert the DC power output from the solar cell modules to AC power. The shut-off device is disposed at a plurality of intermediate points of the string and is configured to shut off a voltage output from the solar cell modules in response to a control signal from the inverter.

In this solar power generation system, since the shut-off device is disposed at a plurality of intermediate points of the string, when the voltage output from the solar cell modules is shut off in response to the control signal from the inverter, the plurality of solar cell modules can be collectively shut off by one shut-off device. Thereby, the installation cost of the shut-off devices can be reduced as compared with the case where the shut-off devices is installed for each solar cell module. Further, it is possible to provide a safer solar power generation system as compared with the case of severing the plurality of solar cell modules and the inverter in a string unit.

The string may include a plurality of solar cell module groups each including the plurality of the solar cell modules. The plurality of solar cell module groups may include at least a first group, a second group connected to the first group, and a third group connected to the second group. The first group may include at least a first solar cell module connected to the second group and a second solar cell module connected to the first solar cell module among the plurality of the solar cell modules. The second group may include at least a third solar cell module connected to the first solar cell module and a fourth solar cell module connected to the third group among the plurality of the solar cell modules. The third group may include at least a fifth solar cell module connected to the fourth solar cell module among the plurality of the solar cell modules. The shut-off device may include a first shut-off device configured to shut off a connection between the first solar cell module and the third solar cell module by shutting off a voltage output from the first solar cell module and second shut-off device configured to shut off a connection between the fourth solar cell module and the fifth solar cell module by shutting off a voltage output from the fourth solar cell module. In this case, the same effects as described above can be obtained.

The first shut-off device may be connected to a first circuit connecting the first solar cell module and the second solar cell module, and a second circuit connecting the first solar cell module and the third solar cell module. The second shut-off device may be connected to a third circuit connecting a solar cell module connected to the fourth solar cell module in the second group and the fourth solar cell module, and a fourth circuit connecting the fourth solar cell module and the fifth solar cell module. In this case, the wiring connecting the shut-off device and the plurality of solar cell modules becomes short and simple.

The first shut-off device may be driven by an electrical power generated by the first solar cell module. The second shut-off device may be driven by an electrical power generated by the fourth solar cell module. In this case, for example, when installing the shut-off device in an existing solar power generation system, it is not necessary to connect the inverter and the shut-off device to secure the power supply for the shut-off device. Thereby, since additional wiring for connecting the inverter and the shut-off device can be omitted, a reduction in the installation cost of the shut-off device can be achieved. In addition, the drive voltage range of the shut-off device can be kept small, the manufacturing cost of the shut-off device can be reduced.

The inverter may be configured to output the control signal to the shut-off device by power line communication. In this case, when installing the shut-off device in an existing solar power generation system, since additional wiring for ensuring communication between the inverter and the shut-off device can be omitted, a reduction in the installation cost of the shut-off device can be achieved.

The shut-off device may be externally attached to the solar cell modules. In this case, the shut-off device can be easily installed in an existing solar power generation system.

The shut-off device may include a signal receiving unit configured to receive a signal from the inverter, and a bypass circuit for the signal receiving unit to receive the signal from the inverter in a state where the voltage output from the solar cell modules is shut off. In this case, when the voltage output from the solar cell modules is in a shut off state, the shut off state can be released in response to the signal from the inverter.

DETAILED DESCRIPTION

Figure 1:
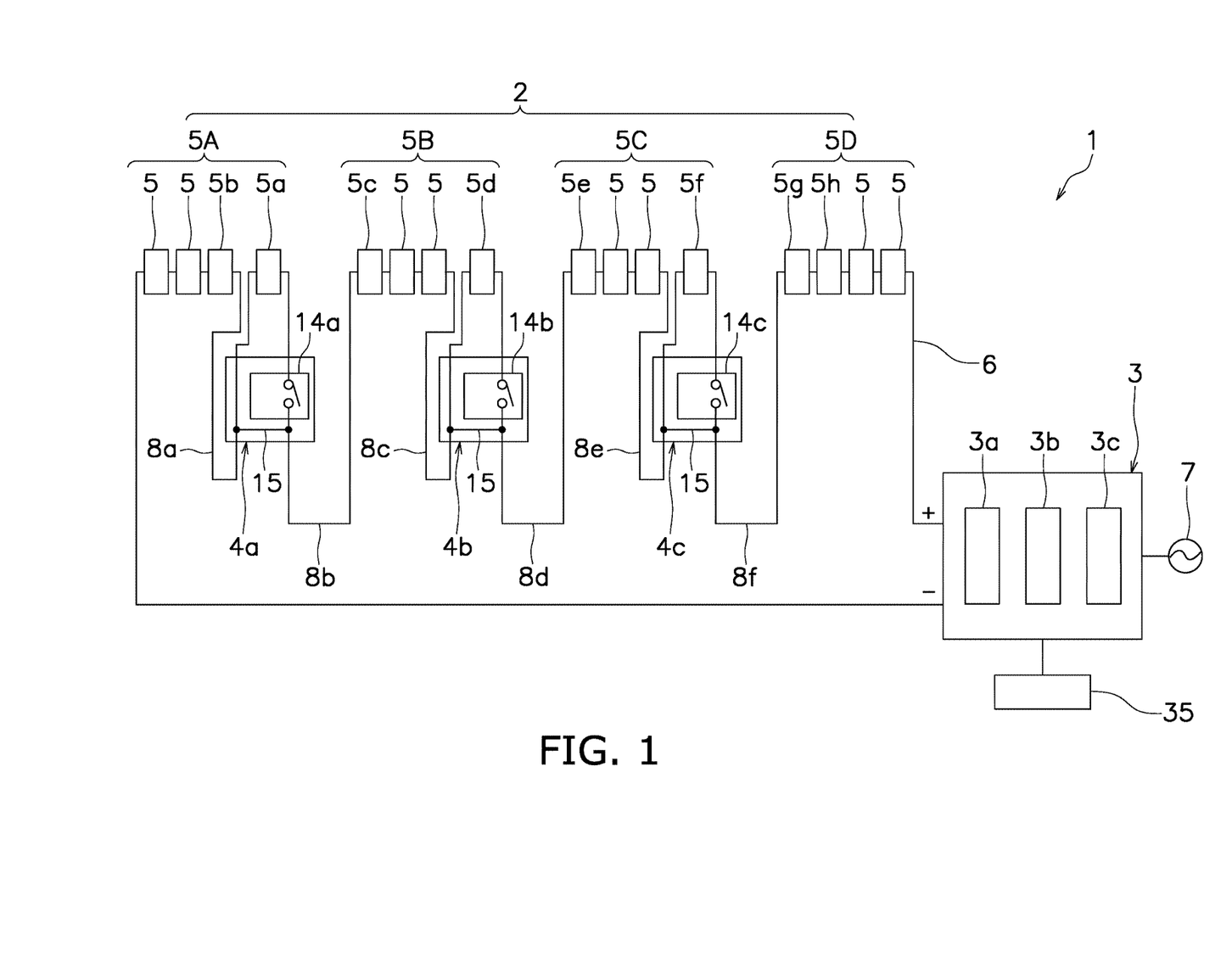
FIG. 1 is a block diagram schematically showing a configuration of a solar power generation system according to an aspect of the present invention.

FIG. 1 is a block diagram schematically showing a configuration of a solar power generation system 1 according to an aspect of the present invention. The solar power generation system 1 includes a string 2, an inverter 3, and a plurality of shut-off devices 4a to 4c.

The string 2 includes a plurality of solar cell modules 5 connected in series with each other. The string 2 in the present embodiment is composed of 16 solar cell modules 5 including the solar cell modules 5a to 5h. The string 2 includes a plurality of solar cell module groups each including the plurality of solar cell modules 5.

Specifically, the string 2 includes a plurality of solar cell module groups in which the plurality of solar cell modules 5 are divided into three or more groups. The string 2 in the present embodiment includes solar cell module groups 5A to 5D in which the plurality of solar cell modules 5 are divided into four groups. In order to make the following explanation easier to understand, the solar cell module groups 5A to 5D will be described as groups 5A to 5D. The solar cell module 5a is an example of a first solar cell module. The solar cell module 5b is an example of a second solar cell module. The solar cell module 5c is an example of a third solar cell module. The solar cell module 5d is an example of the fourth solar cell module. The solar cell module 5e is an example of the fifth solar cell module.

The group 5A is connected to the group 5B. The group 5A includes at least the solar cell module 5a and the solar cell module 5b among the plurality of solar cell modules 5. The solar cell module 5a is connected to the group 5B. The solar cell module 5b is connected to the solar cell module 5a. As shown in FIG. 1, the group 5A in the present embodiment is composed of four solar cell modules 5 including the solar cell modules 5a and 5b.

The group 5B is positioned between the group 5A and the group 5C and is connected to the group 5A and the group 5C. The group 5B includes at least the solar cell module 5c and the solar cell module 5d among the plurality of solar cell modules 5. The solar cell module 5c is connected to the solar cell module 5a. The solar cell module 5d is connected to the group 5C. The group 5B in the present embodiment is composed of four solar cell modules 5 including the solar cell modules 5c, 5d, and two solar cell modules 5 disposed between the solar cell module 5c and the solar cell module 5d.

The group 5C is positioned between the group 5B and the group 5D and is connected to the group 5B and the group 5D. The group 5C includes at least the solar cell module 5e and the solar cell module 5f among the plurality of solar cell modules 5. The solar cell module 5e is connected to the solar cell module 5d. The solar cell module 5f is connected to the group 5D. The group 5C in the present embodiment is composed of four solar cell modules 5 including the solar cell modules 5e, 5f, and two solar cell modules 5 disposed between the solar cell module 5e and the solar cell module 5f.

The group 5D is connected to the group 5C. The group 5D includes at least the solar cell module 5g and the solar cell module 5h among the plurality of solar cell modules 5. The solar cell module 5g is connected to the solar cell module 5f. The solar cell module 5h is connected to the solar cell module 5g. The group 5D in the present embodiment is composed of four solar cell modules 5 including the solar cell modules 5g and 5h.

That is, each of the solar cell module groups 5A to 5D in the present embodiment includes four solar cell modules 5 connected in series. The solar power generation system 1 may include a solar cell array in which a plurality of the strings 2 are connected in parallel.

The solar cell module 5 receives sunlight to generate electrical power, and outputs the generated electrical power to the inverter 3. The open circuit voltage of the solar cell module 5 is, for example, 50V. The inverter 3 is connected to the string 2 via a power line 6. The inverter 3 converts the DC power output from the solar cell module 5a into AC power. The inverter 3 is connected to a power system 7 and thereby supplies AC power to a commercial power system and a load device.

Specifically, the inverter 3 includes a DC/DC converter 3a, a DC/AC inverter 3b, and a control unit 3c. The DC/DC converter 3a converts the voltage of the electrical power output from the solar cell modules 5 into a predetermined voltage that is input to the DC/AC inverter 3b. The DC/AC inverter 3b converts the DC power output from the solar cell modules 5 into AC power via the DC/DC converter 3a. The control unit 3c includes a CPU, a memory, and the like, and controls the DC/DC converter 3a and the DC/AC inverter 3b. Further, the control unit 3c outputs a control signal to the shut-off devices 4a to 4c by power line communication.

The shut-off devices 4a to 4c are disposed at a plurality of intermediate points of the string 2 and are configured to shut off a voltage output from the solar cell modules 5 in response to a control signal from the inverter 3. The intermediate point here means an electric circuit to which the solar cell modules 5 are connected to each other. The shut-off devices 4a to 4c are externally attached to the solar cell modules 5.

The shut-off devices 4a to 4c are not provided with a bypass diode. Therefore, when the voltage output from the solar cell module 5a is shut off by the shut-off devices 4a to 4c, the voltage input to the inverter 3 is shut off.

The shut-off device 4a shuts off the connection between the solar cell module 5a and the solar cell module 5c by shutting off the voltage output from the solar cell module 5a. As a result, the connection between the group 5A and the group 5B are shut off. The shut-off device 4a is connected to an electrical path 8a and an electrical path 8b. The electrical path 8a connects the solar cell module 5a and the solar cell module 5b. The electrical path 8b connects the solar cell module 5a and the solar cell module 5c. The shut-off device 4a is driven by the electrical power generated by the solar cell module 5a.

The shut-off device 4b shuts off the connection between the solar cell module 5d and the solar cell module 5e by shutting off the voltage output from the solar cell module 5d. As a result, the connection between the group 5B and the group 5C are shut off. The shut-off device 4b is connected to an electrical path 8c and an electrical path 8d. The electrical path 8c connects the solar cell module 5 connected to the solar cell module 5d in the group 5B and the solar cell module 5d. The electrical path 8d connects the solar cell module 5d and the solar cell module 5e. The shut-off device 4b is driven by the electrical power generated by the solar cell module 5d.

The shut-off device 4c shuts off the connection between the solar cell module 5f and the solar cell module 5g by shutting off the voltage output from the solar cell module 5f.

As a result, the connection between the group 5C and the group 5D are shut off. The shut-off device 4b is connected to an electrical path 8e and an electrical path 8f. The electrical path 8e connects the solar cell module 5 connected to the solar cell module 5f in the group 5C and the solar cell module 5f. The electrical path 8f connects the solar cell module 5f and the solar cell module 5g. The shut-off device 4c is driven by the electrical power generated by the solar cell module 5f.

Figure 2:
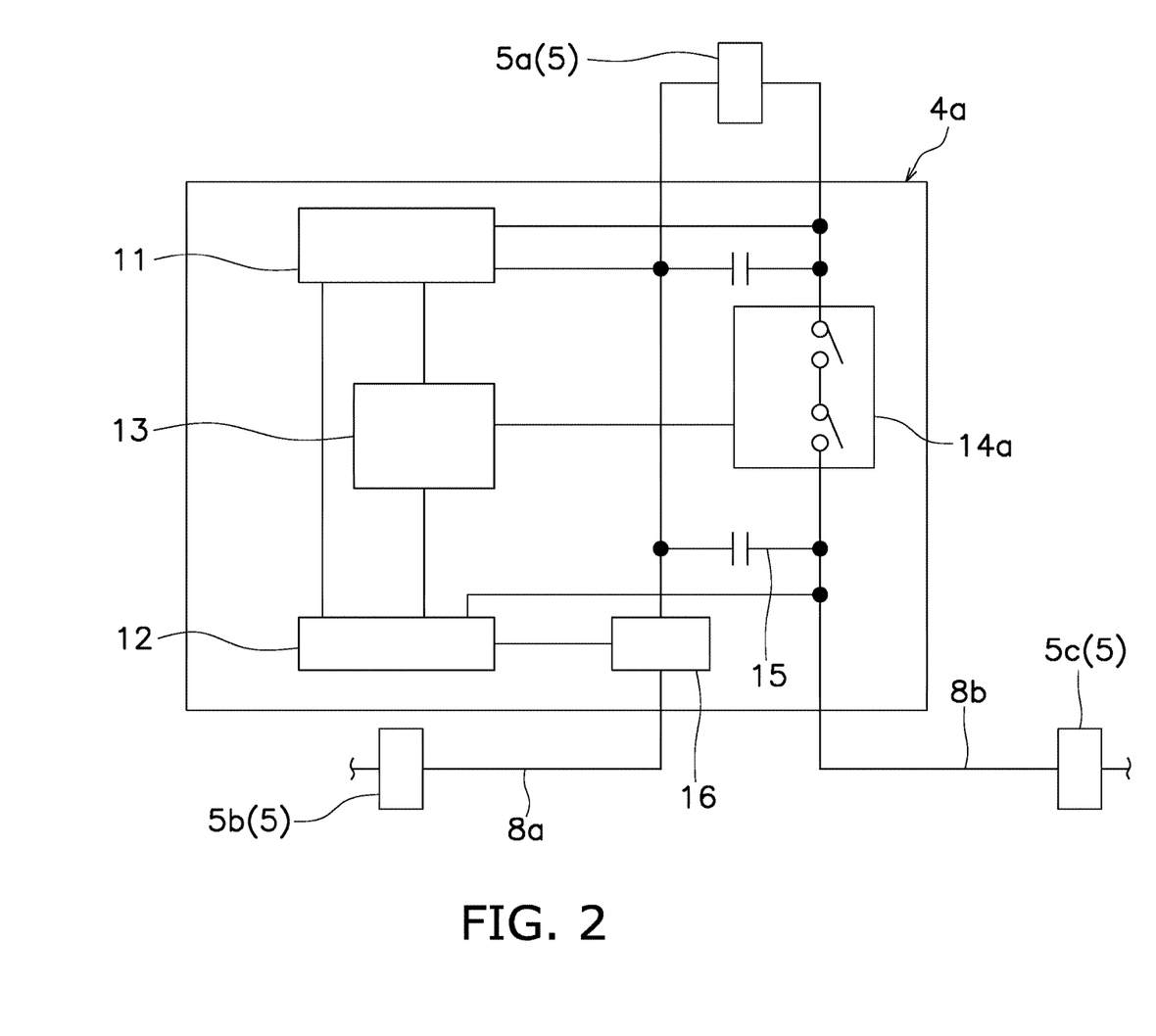
FIG. 2 is a block diagram schematically showing a configuration of a shut-off device.

FIG. 2 is a block diagram schematically showing a configuration of the shut-off device 4a. The shut-off device 4a includes a regulator 11, a signal receiving unit 12, a relay control unit 13, a relay 14a, and a bypass circuit 15.

The regulator 11 uses the electrical power generated by the solar cell module 5a as a power source to generate a drive power source for driving the shut-off device 4a and supplies the drive power source in a stable state to the shut-off device 4a. Here, the regulator 11 uses only the electrical power generated by a single solar cell module 5 (solar cell module 5a) to generate the drive power source for the shut-off device 4a. Since the drive voltage range of the regulator 11 can be kept small, the manufacturing cost of the shut-off device 4a can be reduced.

Figure 3:
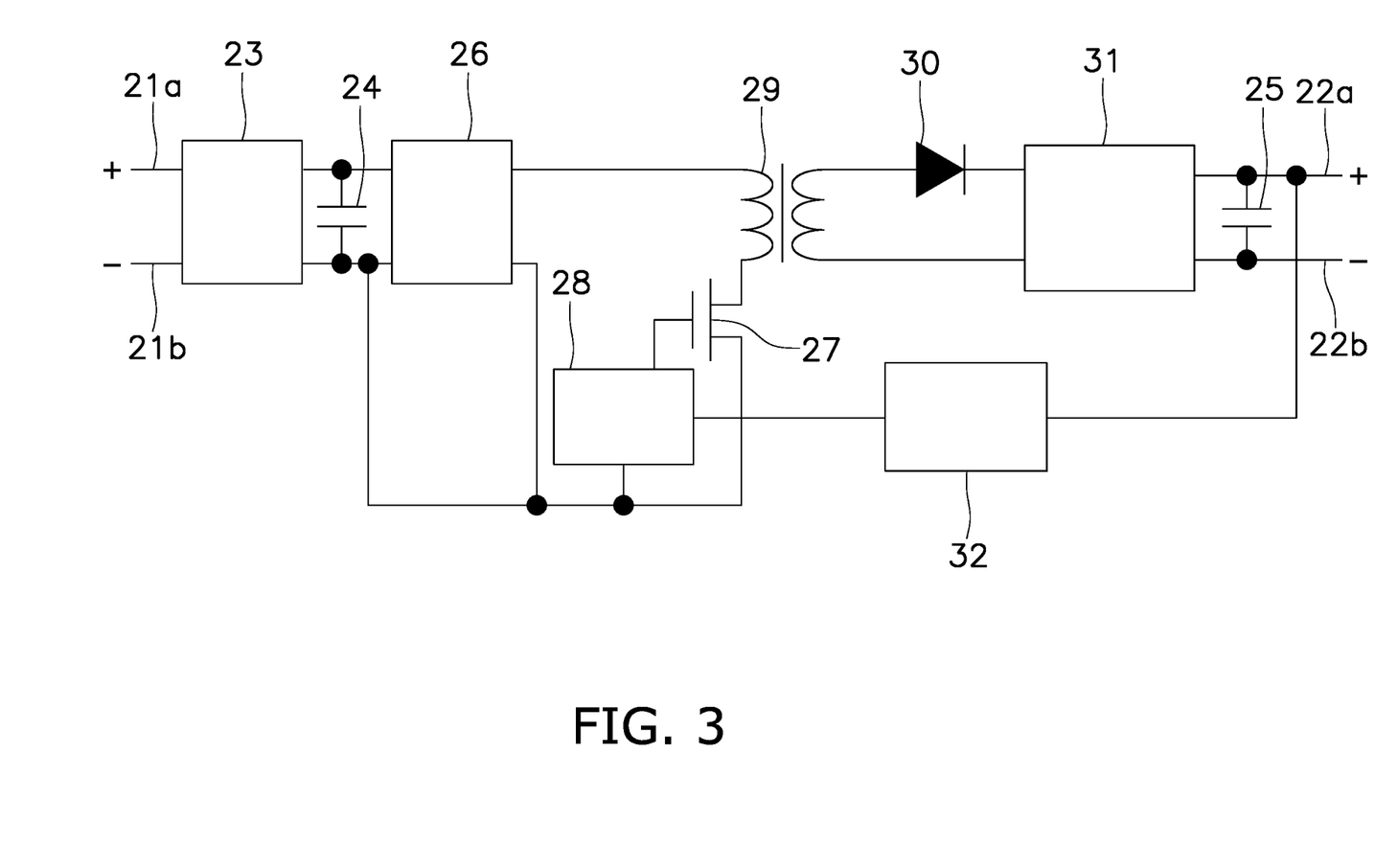
FIG. 3 is a circuit diagram schematically showing a configuration of the regulator.

FIG. 3 is a circuit diagram schematically showing a configuration of the regulator 11. The configuration of the regulator 11 is a well-known configuration, and includes input terminals 21a, 21b, output terminals 22a, 22b, a line filter 23, capacitors 24, 25, a booster circuit 26, a switching element 27, a control circuit 28, a transformer 29, a diode 30, a DC/DC converter 31, a feedback circuit 32 and the like.

The signal receiving unit 12 receives a control signal from the control unit 3c of the inverter 3 and outputs the received control signal to the relay control unit 13. Specifically, the signal receiving unit 12 receives the control signal from the control unit 3c of the inverter 3 via a signal detecting unit 16 that detects the control signal from the control unit 3c of the inverter 3.

On the basis of the signal output from the signal receiving unit 12, the relay control unit 13 controls the current value flowing through the coil of the relay 14a to control the opening and closing of the contacts of the relay 14a. The relay 14a is disposed in the electrical path 8d.

The relay 14a is, for example, a mechanical relay in which contacts are connected in series and is capable of opening and closing a high-voltage direct current. When the drive power is not supplied to the shut-off device 4a, the contacts of the relay 14 are always in the open state. Therefore, when the shut-off device 4a is not driven, the connection between the group 5A and group 5B is shut off.

The bypass circuit 15 is a circuit for allowing the signal receiving unit 12 to receive the control signal from the control unit 3c when the shut-off device 4a is in a shut-off state. When the voltage output from the solar cell module 5a is shut off by the shut-off device 4a, the signal receiving unit 12 can receive the control signal from the control unit 3c via the bypass circuit 15.

Since the configurations of the shut-off device 4b and the shut-off device 4c are the same as those of the shut-off device 4a except that the connected electrical path is different from the shut-off device 4a, descriptions thereof will be omitted.

Figure 4:
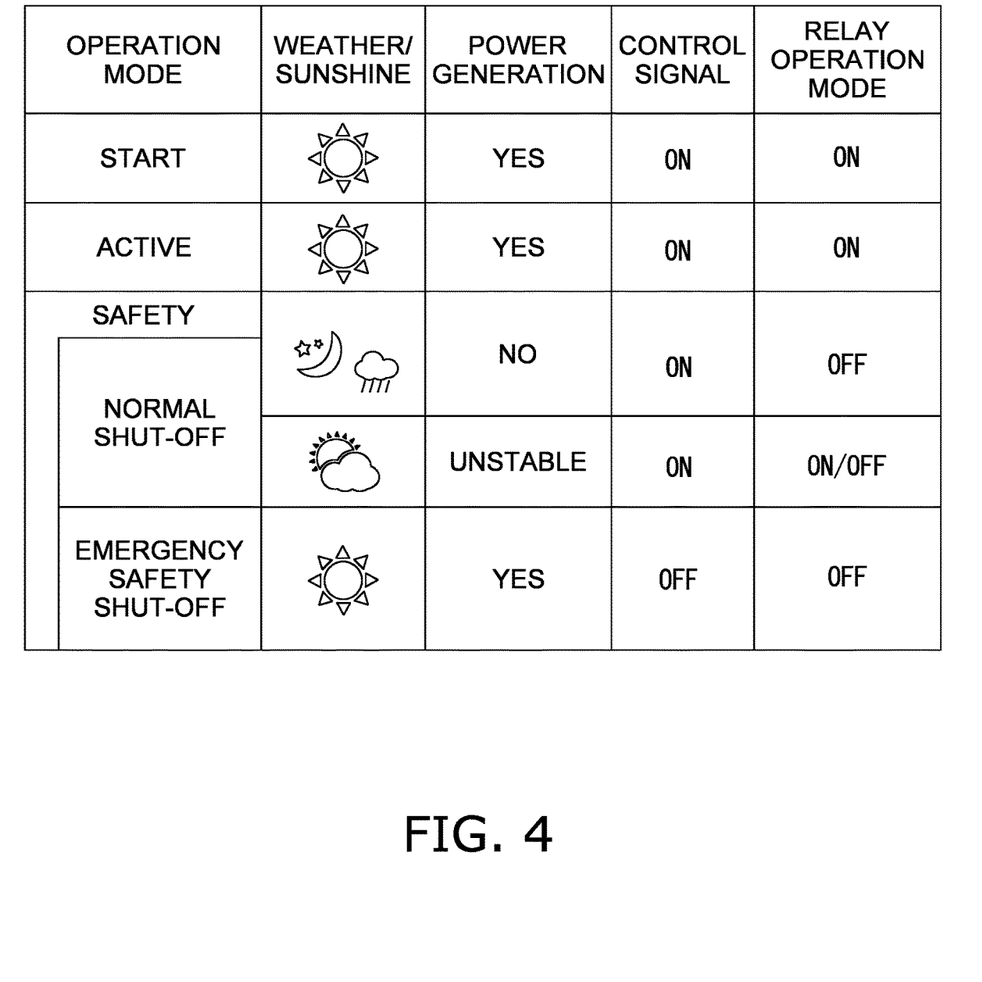
FIG. 4 is a diagram illustrating an example of an operation mode of the shut-off device.

Next, an example of the operation modes of the shut-off devices 4a to 4c will be described with reference to FIG. 4. The operation modes of the shut-off devices 4a to 4c include three operation modes of a start mode, an active mode, and a safety mode. The safety mode includes a normal shut-off mode and an emergency safety shut-off mode.

Therefore, the shut-off devices 4a to 4c operate in four operation modes: a start mode, an active mode, a normal shut-off mode, and an emergency safety shut-off mode.

Figure 5:
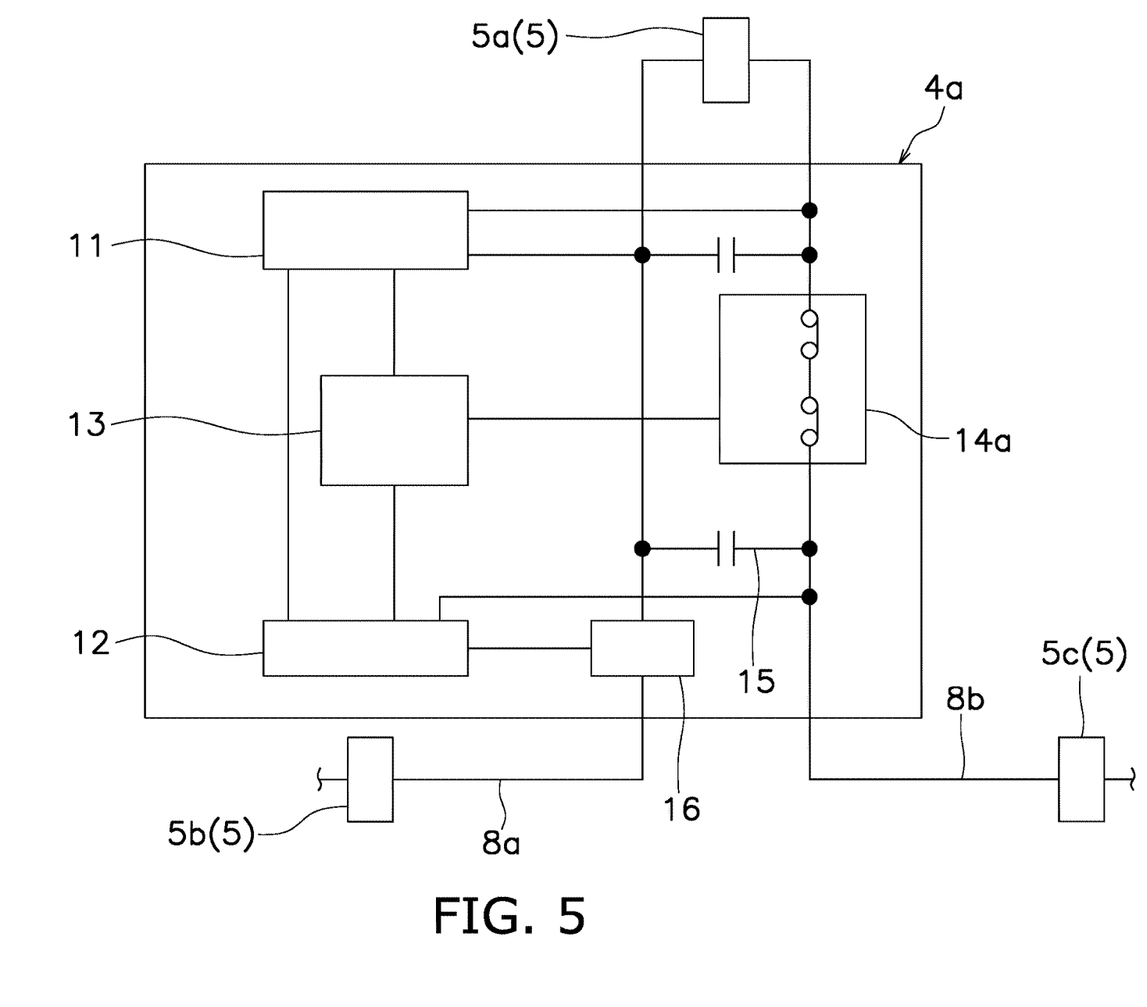
FIG. 5 is a block diagram schematically showing a configuration of a shut-off device.

The start mode is a mode when sunlight starts to hit the solar cell modules 5. At this time, each of the solar cell modules 5 receives sunlight to generate electrical power. Then, the shut-off device 4a is driven by the drive power source generated by the regulator 11 from the electrical power generated by the solar cell module 5a. When the shut-off device 4a is driven and the relay control unit 13 receives the control signal from the control unit 3c of the inverter 3 via the signal receiving unit 12, the relay control unit 13 performs control so as to close the contacts of the relay 14a as shown in FIG. 5. Similarly, the shut-off device 4b is driven by the electrical power generated by the solar cell module 5d, and closes the contacts of the relay 14b disposed in the electrical path 8d in response to the control signal from the control unit 3c of the inverter 3. Similarly, the shut-off device 4c is driven by the electrical power generated by the solar cell module 5f, and closes the contacts of the relay 14c disposed in the electrical path 8f in response to the control signal from the control unit 3c of the inverter 3. As a result, the groups 5A to 5D are connected via the shut-off devices 4a to 4c, and the electrical power generated by each solar cell module 5 including the solar cell modules 5a to 5h is output to the inverter 3.

The active mode is a state in which each of the solar cell modules 5 receives sunlight during the day to generate electricity, which is substantially the same as the start mode. Therefore, in the active mode, the groups 5A to 5D are in a connected state via the shut-off devices 4a to 4c, and the electrical power generated by each of the solar cell modules 5 is output to the inverter 3.

The normal shut-off mode is a mode when the solar cell modules 5 are not receiving sunlight during nighttime or due to the influence of the weather such as rain. Therefore, in the normal shut-off mode, electrical power is not generated by the solar cell modules 5, and drive power source is not supplied from the solar cell module 5a to the shut-off device 4a. Similarly, drive power source is not supplied to the shut-off device 4b and the shut-off device 4c. Therefore, in the normal shut-off mode, the connection between the solar cell module groups 5A to 5D is shut off. In the present embodiment, electrical power is supplied to the inverter 3 from the AC power supply, and the control signal is always output from the control unit 3c of the inverter 3 except in the emergency safety shut-off mode.

In the normal shut-off mode, for example, when the power generation of the solar cell module 5a is unstable due to unstable weather or the like, the relay operate on/off in response to the electrical power supplied by the solar cell module 5a.

The emergency safety shut-off mode is a mode in which the connections between the groups 5A to 5D are shut off during the start mode or the active mode to stop the output of electrical power from the solar cell modules 5 to the inverter 3. In the present embodiment, as shown in FIG. 1, an operation switch 35 is connected to the inverter 3, and when the operation switch 35 is operated while the shut-off devices 4a to 4c are in the start mode or the active mode, the shut-off devices 4a to 4c switch the operation mode to the emergency safety shut-off mode.

Specifically, when the operation switch 35 is operated, the control unit 3c stops the output of the control signal. When the signal detecting unit 16 detects that the control signal has been stopped for a certain period, as shown in FIG. 1, all the contacts of the relay 14a to 14c are opened via the signal receiving unit 12 and the relay control unit 13. As a result, the voltage output from all the solar cell modules 5 is shut off, and the connections between the groups 5A to 5D are shut off.

In the solar power generation system 1 having the above configuration, when the operation mode of the shut-off devices 4a to 4c is the emergency safety shut-off mode, the shut-off devices 4a to 4c can shut off the plurality of solar cell modules 5. As a result, the installation cost of the shut-off device can be reduced as compared with the case where the shut-off device is installed for each of the solar cell modules 5. Further, it is possible to provide a solar power generation system having higher safety than the case where the solar cell module 5a and the inverter 3 are shut off in the string 2 unit. Specifically, when the open circuit voltage each of the solar cell modules 5 is 50 V, the open circuit voltage for each of the solar cell module groups 5A to 5D in the present embodiment is 200 V, and the open circuit voltage of the string 2 becomes 800 V. Accordingly, if the solar cell modules 5 continue to generate power after the connection between the solar cell module groups 5A to 5D is shut off, the voltage of the solar cell module groups 5A to 5D becomes 200V at the maximum, and the safety is higher than when the connection with the inverter 3 is shut off in the string 2 unit.

Further, in the solar power generation system 1, it is possible to secure communication between the drive power supply of the shut-off devices 4a to 4c and the inverter 3 by using the power line 6. As a result, for example, when the shut-off devices 4a to 4c are installed in an existing solar power generation system, additional wiring for connecting the inverter 3 and the shut-off devices 4a to 4c is not required. Therefore, it is possible to reduce the installation cost when installing the shut-off devices 4a to 4c in an existing solar power generation system.

Further, since the shut-off devices 4a to 4c may be connected to one solar cell module 5, the wiring is shorter and simpler than the case where the shut-off devices 4a to 4c are connected across a plurality of solar cell modules 5. As a result, for example, it is possible to reduce the installation cost when installing the shut-off devices 4a to 4c in an existing solar power generation system, and to perform the construction with high flexibility.

Further, since the bypass diode is omitted in the shut-off devices 4a to 4c, the manufacturing cost of the shut-off devices 4a to 4c can be reduced.

Further, the bypass circuit 15 in the shut-off devices 4a to 4c enables the operation mode of the shut-off devices 4a to 4c to be switched from the emergency safety shut-off mode to the start mode according to the control signal of the control unit 3c.

Although one embodiment of the present invention has been described above, the present invention is not limited to the above embodiment, with various modifications being possible without departing from the gist of the invention.

In the above embodiment, each of the groups 5A to 5D includes four solar cell modules 5, but the number of the solar cell modules 5 is not limited to the above embodiment. Further, each of the groups 5A to 5D does not necessarily include the same number of solar cell modules 5. For example, group 5A may include four solar cell modules 5 and group 5B may include five solar cell modules 5.

In the embodiment, the string 2 includes four groups 5A-5D, but the number of groups is not limited to the embodiment. For example, string 2 may include five groups.

Further, the arrangement and the number of the shut-off devices 4a to 4c are not limited to the above-described embodiment.

In the above-described embodiment, switching to the emergency safety shut-off mode is performed by operating the operation switch 35, but switching from the start mode or the active mode to the emergency safety shut-off mode is not limited to the above-described embodiment. For example, the solar power generation system 1 may be provided with a sensor that detects the output state of the solar cell modules 5. The control unit 3c of the inverter 3 may stop the output of the control signal when an abnormality is detected from the output state of the solar cell modules 5 detected by the sensor, and shut-off devices 4a to 4c may shut off the connections between the groups 5A to 5D. Alternatively, when a fire alarm communicator or a fire alarm is connected to the inverter 3, the inverter 3 may stop the output of the control signal when the inverter receives a signal from the fire alarm communicator or fire alarm, and the shut-off devices 4a to 4c may shut off the connections between the groups 5A to 5D.

REFERENCE NUMERALS

1 Solar power generation system
2 String
3 Inverter
4a-4c Shut-off device
5A-5D Solar cell module group
5 Solar cell module
6 Power line
8a-8f Electrical path
12 Signal receiving unit
15 Bypass circuit

The invention claimed is:

1. A solar power generation system comprising:
a string including a plurality of solar cell modules connected in series;
an inverter connected to the string, the inverter configured to convert DC power output from the solar cell modules to AC power; and
a shut-off device disposed at a plurality of intermediate points of the string, the shut-off device configured to shut off a voltage output from the solar cell modules in response to a control signal from the inverter;
wherein the string includes a plurality of solar cell module groups each including the plurality of the solar cell modules,
the plurality of solar cell module groups includes at least a first group, a second group connected to the first group, and a third group connected to the second group,
the first group includes at least a first solar cell module and a second solar cell module among the plurality of the solar cell modules, the first solar cell module being connected to the second group, the second solar cell module being connected to the first solar cell module,
the second group includes at least a third solar cell module and a fourth solar cell module among the plurality of the solar cell modules, the third solar cell module being connected to the first solar cell module, the fourth solar cell module being connected to the third group,
the third group includes at least a fifth solar cell module among the plurality of the solar cell modules, the fifth solar cell module being connected to the fourth solar cell module,
the shut-off device includes a first shut-off device and a second shut-off device, the first shut-off device configured to shut off a connection between the first solar cell module and the third solar cell module by shutting off a voltage output from the first solar cell module, the second shut-off device configured to shut off a connection between the fourth solar cell module and the fifth solar cell module by shutting off a voltage output from the fourth solar cell module, in each group of solar cell modules, some of the solar cell modules are connected to each other with no shut-off device disposed therebetween, the first shut-off device is driven by an electrical power generated by the first solar cell module, and the second shut-off device is driven by an electrical power generated by the fourth solar cell module.

2. The solar power generation system according to claim 1, wherein the first shut-off device is connected to a first circuit and a second circuit, the first circuit connecting the first solar cell module and the second solar cell module, the second circuit connecting the first solar cell module and the third solar cell module, and the second shut-off device is connected to a third circuit and a fourth circuit, the third circuit connecting a solar cell module connected to the fourth solar cell module in the second group and the fourth solar cell module, the fourth circuit connecting the fourth solar cell module and the fifth solar cell module.

3. The solar power generation system according to claim 1, wherein the inverter is further configured to output the control signal to the shut-off device by power line communication.

4. The solar power generation system according to claim 1, wherein the shut-off device is externally attached to the solar cell modules.

5. The solar power generation system according to claim 1, wherein the shut-off device includes a signal receiving unit configured to receive the control signal from the inverter, and a bypass circuit configured to cause the signal receiving unit to receive the control signal from the inverter in a state where the voltage output from the solar cell modules is shut off.

6. The solar power generation system according to claim 1, wherein the total number of shut-off devices installed in the string is less than the total number of solar cell modules in the string.

7. A solar power generation system, comprising:

a string including a plurality of solar cell modules connected in series;

an inverter connected to the string, the inverter configured to convert DC power output from the solar cell modules to AC power; and a shut-off device disposed at a plurality of intermediate points of the string, the shut-off device configured to shut off a voltage output from the solar cell modules in response to a control signal from the inverter;

wherein the string includes a plurality of solar cell module groups each including the plurality of the solar cell modules, the plurality of solar cell module groups includes at least a first group and a second group connected to the first group, the first group includes at least a first solar cell module and a second solar cell module among the plurality of the solar cell modules, the first solar cell module being connected to the second group, the second solar cell module being connected to the first solar cell module, the second group includes at least a third solar cell module and a fourth solar cell module among the plurality of the solar cell modules, the third solar cell module being connected to the first solar cell module, and the shut-off device includes a first shut-off device and a second shut-off device, the first shut-off device being driven by an electrical power generated by the first solar cell module, the second shut-off device being driven by an electrical power generated by the fourth solar cell module.

\* \* \* \* \*